(12) United States Patent
Burke

(10) Patent No.: US 6,648,484 B1
(45) Date of Patent: Nov. 18, 2003

(54) CASE FOR ENCAPSULATING MIRROR ELEMENT

(75) Inventor: Stephen L. Burke, Bryant, IN (US)

(73) Assignee: Lear Corporation, Southfield, MI (US)

( * ) Notice: Subject to any disclaimer, the term of this patent is extended or adjusted under 35 U.S.C. 154(b) by 125 days.

(21) Appl. No.: 09/931,990

(22) Filed: Aug. 17, 2001

Related U.S. Application Data

(60) Provisional application No. 60/225,945, filed on Aug. 17, 2000.

(51) Int. Cl.[7] ............................................... G02B 7/182
(52) U.S. Cl. .................................................... 359/879
(58) Field of Search ................................. 359/838, 871, 359/879, 872

(56) References Cited

U.S. PATENT DOCUMENTS

| 4,436,371 A | * | 3/1984 | Wood et al. ................. 359/603 |
| 4,826,289 A | * | 5/1989 | Vandenbrink et al. ...... 359/605 |

* cited by examiner

*Primary Examiner*—Euncha Cherry
(74) *Attorney, Agent, or Firm*—Bill C. Panagos

(57) ABSTRACT

A case comprises a back wall, a side wall integral with the back wall, and a lip extending from the side wall. The lip defines an opening that is adapted to receive a mirror element. A biasing element is adapted to act upon the mirror element when the mirror element is encapsulated in the case to apply a force against the mirror element in a first direction. The biasing element is coupled to the side wall of the case to pull the side wall in a second direction so as to pull the lip against the mirror element.

19 Claims, 3 Drawing Sheets

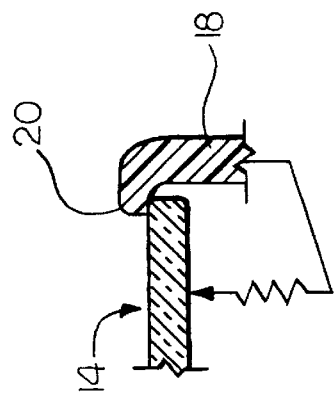
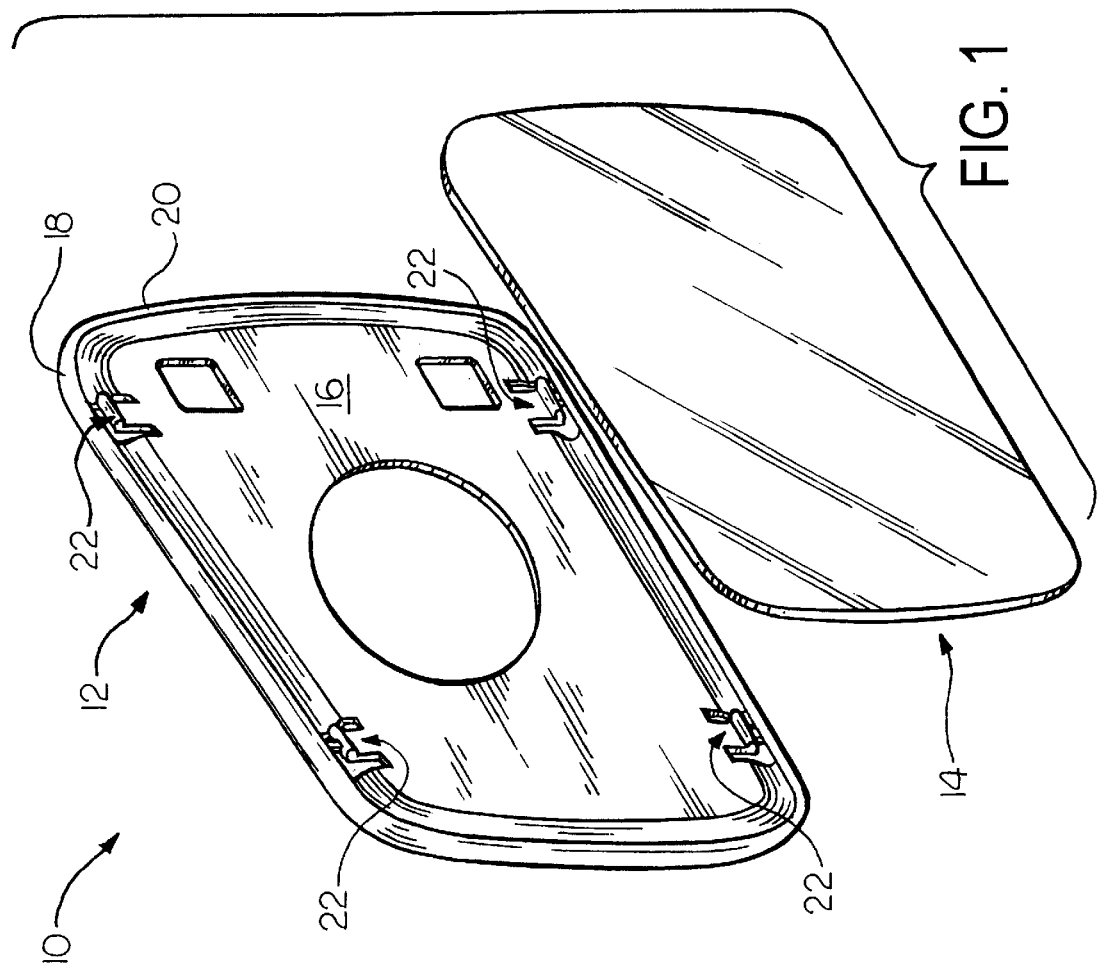

CASE FOR ENCAPSULATING MIRROR ELEMENT

CROSS-REFERENCE TO RELATED APPLICATIONS

This application claims the benefit of U.S. Provisional Patent Application No. 60/225,945, filed on Aug. 17, 2000.

BACKGROUND OF THE INVENTION

This invention relates in general to mirror assemblies for motor vehicles and, in particular, to a case for encapsulating a mirror element. Most particularly, the invention relates to a biasing element for biasing a mirror element towards a lip of a case while pulling the lip towards the mirror.

Mirror assemblies are generally comprised of a case and a mirror element, typically a transparent glass, prismatic element. Mirror elements are generally attached to the surface of the case with glue or double-stick tape. Alternatively, cases encapsulate mirror elements. Such cases include a lip defining an opening. The opening is smaller than the mirror element but the lip is flexible to permit the opening to receive the mirror element. Tension tabs are provided in the case to act against the mirror to reduce vibration of the mirror element. An undesirable gap remains present between the mirror element and the lip of the case.

A mirror assembly is needed that further reduces the risk that the mirror element will vibrate and that reduces the risk of a gap being present between the mirror element and the lip of the case.

SUMMARY OF THE INVENTION

The present invention is directed towards a case for encapsulating a mirror element. The case reduces the risk of the mirror element vibrating and reduces the risk of a gap being present between the mirror element and the lip of the case. The case comprises a back wall. A side wall is integral with the back wall. A lip extends from the side wall. The lip defines an opening that is adapted to receive the mirror element. A biasing element is adapted to act upon the mirror element when the mirror element is encapsulated in the case to apply a force against the mirror element in a first direction. The biasing element is coupled to the side wall of the case to pull the side wall in a second direction so as to pull the lip against the mirror element.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is an exploded perspective view of a mirror assembly comprising a case and a mirror element encapsulated in the case.

FIG. 2 is a diagrammatic representation of a biasing element that acts upon the mirror element when the mirror element is encapsulated in the case.

DETAILED DESCRIPTION OF THE PREFERRED EMBODIMENT

Figure 3:
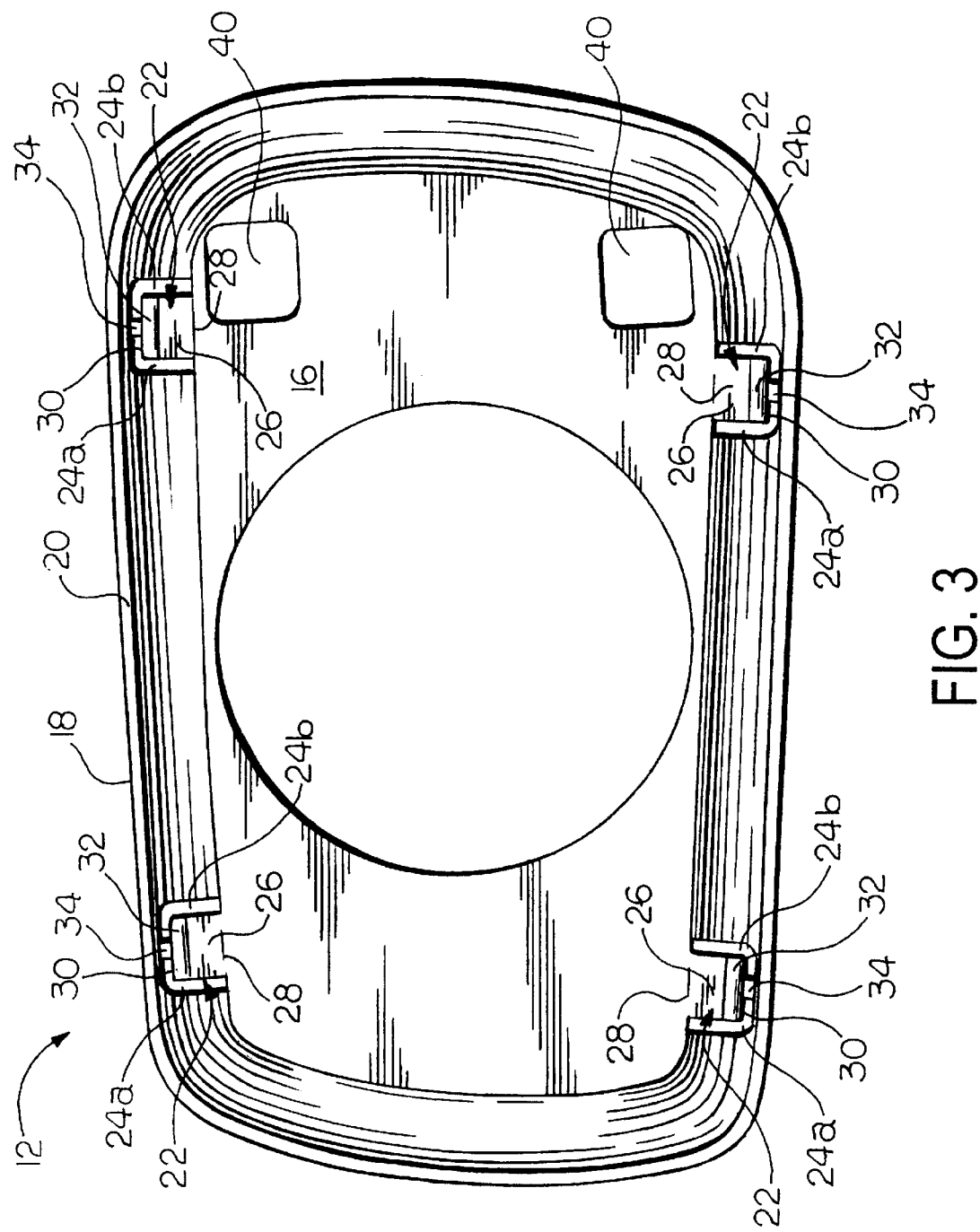
FIG. 3 is an enlarged rear elevational view of the case shown in FIG. 1.

Referring now to the drawings, there is illustrated in FIG. 1 a mirror assembly 10 that is adapted for use with a motor vehicle. The assembly 10 comprises a case 12 and a mirror element 14 encapsulated in the case 12. The case 12 is held by a mirror shell or body, which is not shown.

The case 12 is preferably molded from a flexible polymer, such as synthetic polypropylene. Polypropylene has a low water absorption property and is substantially impermeable to moisture. It is not attacked by fungi or bacteria and it resists acids and alkalis. It has a fair resistance to abrasions and a good heat resistance. Moreover, it has a high-impact strength and maintains its strength after flexing. Polypropylene may be readily colored and protected against oxidation by antioxidants. Hence, polypropylene is suitable for molding a mirror assembly that is adapted for use with motor vehicles.

The case 12 is preferably a molded hollow structure having a back wall 16 and a continuous peripheral side wall 18 integral with the back wall 16. A rim or lip 20 extends around the rearward edge of the peripheral side wall 18. The lip 20 is spaced from the back wall 16, forming a channel between the back wall 16 and the lip 20. The lip 20 defines an opening that is adapted to receive the mirror element 14. The opening is normally positioned to face rearward of the motor vehicle when held by the mirror body.

A biasing element acts upon the mirror element 14 when the mirror element 14 is encapsulated in the case 12. The biasing element is held in tension or compression when the mirror element 14 is encapsulated in the case 12 to apply a force against the mirror element 14 in the direction of arrow R (shown in FIG. 4), rearward of the motor vehicle. The biasing element is coupled to the peripheral side wall 18 so that it may act upon the peripheral side wall 18 to pull the peripheral side wall 18 forward, in the direction of arrow F (also shown in FIG. 4). This is diagrammatically represented in FIG. 2.

As shown in FIG. 3, the biasing element may be in the form of a tab 22. The tab 22 may be supported by the back wall 16 of the case 12. The tab 22 may be formed in any suitable manner. In a preferred embodiment, the tab 22 is integral with the back wall 16. The periphery of the tab 22 may be defined by holes 24a, 24b in the back wall 16. As shown in the drawings, the tab 22 may be defined by a body 26 having opposing ends 28, 30. A first end 28 is integrally connected to the back wall 16. A second end 30 is adapted to move freely relative to the first end 28.

Figure 4:
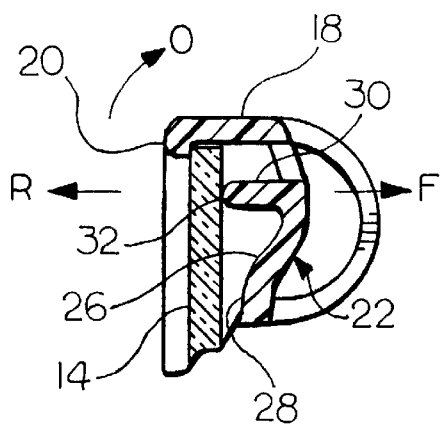
FIG. 4 is an enlarged partial sectional view of a mirror element between the lip of the case by a biasing element in the form of a tab placed in tension.

The free end 30 of the body 26 may be provided with a protrusion or bump 32 that extends rearward of the body 26 towards the opening of the case 12. The mirror element 14 is adapted to be received between the lip 20 and the bump 32, as shown in FIG. 4.

The opening of the case 12 is normally smaller than the periphery of the mirror element 14. The mirror element 14 may be inserted through the opening by flexing the peripheral side wall 18 outwardly in the direction of arrow O. When the mirror element 14 is completely inserted through the opening, the peripheral side wall 18 returns to a normal position in a direction opposite arrow O to trap the mirror element 14 in the case 12.

Upon inserting the mirror element 14 through the opening, the mirror element 14 engages the bump 32 of each tab 22, causing the free end 30 of the body 26 of each tab 22 to flex forward in the direction of arrow F. As the free end 30 flexes forward, the body 26 is placed in tension. The tabs 22 act upon the mirror element 14 to apply a force against the mirror element 14 in the direction of arrow R. This application of force against the mirror element 14 reduces the risk that the mirror element 14 will vibrate.

Figure 5:
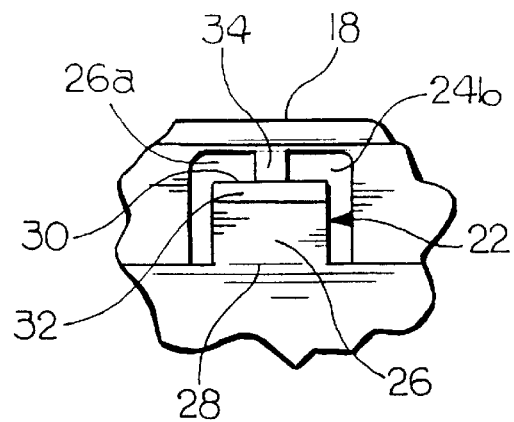
FIG. 5 is an enlarged elevational view of a portion of the case shown in FIGS. 1 and 3 with holes therein defining a tab.
Figure 6:
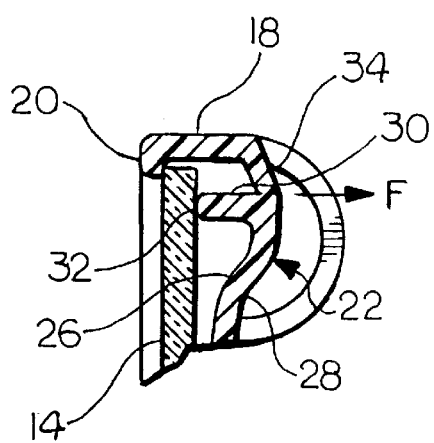
FIG. 6 is an enlarged partial sectional view of a tab placed in tension and a tie-in element pulling the peripheral wall of the case, which in turn pulls the lip of the case against the mirror element.

A portion of the tab 22 is coupled to the peripheral side wall 18 by a tie-in element 34, as shown in FIG. 5. As the body 26 of the tab 22 is placed in tension and compression, the tie-in element 34 pulls the peripheral side wall 18 forward in the direction of arrow F, as shown in FIG. 6. The peripheral side wall 18 is pulled forward to engage the periphery of the mirror element 14 and thus reduce the risk of a gap being present between the mirror element 14 and the lip 20.

The flexible lip 20, the biasing elements, and the tie-in elements 34 cooperate to hold the mirror element 14 tightly in the case 12 with reduced vibration and with reduced risk of a gap being present between the mirror element 14 and the lip 20.

Figure 7:
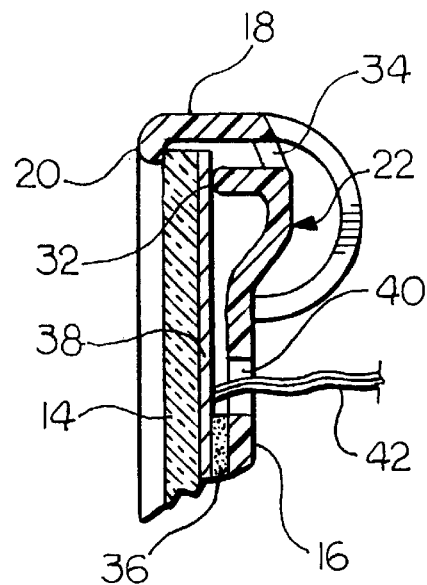
FIG. 7 is an enlarged partial sectional view of a heater attached to a mirror element and double-stick tape adhered between the heater and the back wall of the case.

If desired, double-stick tape 36, as shown in FIG. 7, may be applied between the mirror element 14 and the back wall 16 of the case 12. The tape 36 will further ensure that the mirror element 14 is held tightly in the case 12 with reduced vibration. It may also be desirable to attach a heater 38 to the back of the mirror element 14 and apply the tape 36 between the back wall 16 of the case 12 and the heater 38. A hole 40 may be provided in the back wall 16 through which wires 42 may pass from the heater 38 to the mirror body.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A case for encapsulating a mirror element, said case comprising:
   a back wall;
   a side wall integral with said back wall;
   a lip extending from said side wall, said lip defining an opening that is adapted to receive the mirror element; and
   a biasing element adapted to act upon the mirror element when the mirror element is encapsulated in said case to apply a force against the mirror element in a first direction, said biasing element being coupled to said side wall to pull said side wall in a second direction so as to pull said lip against the mirror element.

2. The case of claim 1, wherein said case is molded from a flexible polymer.

3. The case of claim 1, wherein said case is molded from polypropylene.

4. The case of claim 1, wherein said biasing element is a tab supported by said back wall of said case.

5. The case of claim 4, wherein said tab is integral with said back wall.

6. The case of claim 4, wherein said tab is defined by holes in said back wall.

7. The case of claim 4, wherein said tab has a first end integrally connected to said back wall and a second end is adapted to move freely.

8. The case of claim 4, wherein said tab has a bump, the mirror element is adapted to be received between said lip and said bump.

9. A case for encapsulating a mirror element, said case comprising:
   a back wall;
   a side wall integral with said back wall;
   a lip extending from said side wall, said lip defining an opening that is adapted to receive the mirror element; and
   a biasing element adapted to act upon the mirror element when the mirror element is encapsulated in said case to apply a force against the mirror element in a first direction, said biasing element being a tab supported by said back wall and coupled to said side wall to pull said side wall in a second direction so as to pull said lip against the mirror element, wherein a portion of said tab is coupled to said side wall by a tie-in element, said tie-in element being adapted to pull said side wall to engage said lip with the mirror element.

10. The case of claim 1, wherein said opening of said case is normally smaller than the periphery of the mirror element, the mirror element being insertable through said opening by flexing said side wall.

11. A mirror assembly comprising:
    a mirror element; and
    a case encapsulating said mirror element, said case comprising a back wall, a side wall integral with said back wall, a lip extending from said side wall, said lip defining an opening that is adapted to receive said mirror element, and a biasing element acting upon said mirror element when said mirror element is encapsulated in said case to apply a force against said mirror element in a first direction, said biasing element being coupled to said side wall to pull said peripheral side wall in a second direction.

12. The mirror assembly of claim 11, wherein said biasing element is a tab supported by said back wall of said case.

13. The mirror assembly of claim 12, wherein said tab is integral with the back wall.

14. The mirror assembly of claim 12, wherein said tab is defined by holes in said back wall.

15. The mirror assembly of claim 12, wherein said tab has a first end integrally connected to said back wall and a second end adapted to move freely.

16. The mirror assembly of claim 12, wherein said tab has a bump, said mirror element being received between said lip and said bump.

17. A mirror assembly comprising:
    a mirror element; and
    a case encapsulating said mirror element, said case comprising a back wall, a side wall integral with said back wall, a lip extending from said side wall, said lip defining an opening that is adapted to receive said mirror element, and a biasing element acting upon said mirror element when said mirror element is encapsulated in said case to apply a force against said mirror element in a first direction, said biasing element being coupled to said side wall to pull said peripheral side wall in a second direction, wherein said biasing element is a tab supported by said back wall of said case, wherein a portion of said tab is coupled to said side wall by a tie-in element that pulls said side wall to engage said lip with said mirror element.

18. A mirror case of for encapsulating a mirror element, said case comprising: a back wall;

a side wall integral with said back wall;

a lip extending from said side wall, said lip defining an opening that is adapted to receive the mirror element; and a biasing element adapted to act upon the mirror element when the mirror element is encapsulated in said case to apply a force against the mirror element in a first direction, said biasing element being a tab supported by said back wall and coupled to said side wall to pull said side wall in a second direction so as to pull said lip against the mirror element, wherein said tab has a first end integrally connected to said back wall and a second end is adapted to move freely, said second end having a bump, the mirror element being adapted to be received between said lip and said bump, said second end of said tab further being coupled to said side wall by a tie-in element, said tie-in element being adapted to pull said side wall to engage said lip with the mirror element.

19. A mirror assembly comprising:

a mirror element; and a case encapsulating said mirror element, said case comprising a back wall, a side wall integral with said back wall, a lip extending from said side wall, said lip defining an opening that is adapted to receive said mirror element, and a biasing element acting upon said mirror element when said mirror element is encapsulated in said case to apply a force against said mirror element in a first direction, said biasing element being coupled to said side wall to pull said peripheral side wall in a second direction, wherein said biasing element is a tab supported by said back wall of said case, wherein said tab has a first end integrally connected to said back wall and a second end is adapted to move freely, said second end having a bump, the mirror element being adapted to be received between said lip and said bump, said second end of said tab further being coupled to said side wall by a tie-in element, said tie-in element being adapted to pull said side wall to engage said lip with the mirror element.

* * * * *